United States Patent [19]
Hutchison, IV et al.

[11] Patent Number: 5,790,589
[45] Date of Patent: Aug. 4, 1998

[54] SYSTEM AND METHOD FOR RAPIDLY REACQUIRING A PILOT CHANNEL

[75] Inventors: James A. Hutchison, IV; Robbin D. Hughes, both of San Diego, Calif.

[73] Assignee: Qualcomm Incorporated, San Diego, Calif.

[21] Appl. No.: 696,769

[22] Filed: Aug. 14, 1996

[51] Int. Cl.$^6$ .................................................. H04B 15/00
[52] U.S. Cl. ........................ 375/200; 375/205; 379/59
[58] Field of Search ............................. 375/200, 205, 375/206, 208; 370/332; 455/3.2, 33.2, 38.1, 38.2, 38.3, 56.1; 379/59, 60

[56] References Cited

U.S. PATENT DOCUMENTS

| | | | |
|---|---|---|---|
| 3,715,508 | 2/1973 | Blasbalg | 179/15 BC |
| 4,052,565 | 10/1977 | Baxter et al. | 179/1.5 |
| 4,301,530 | 11/1981 | Gutleber | 370/18 |
| 4,460,992 | 7/1984 | Gutleber | 370/19 |
| 4,472,815 | 9/1984 | Gutleber | 375/34 |
| 4,635,221 | 1/1987 | Kerr | 364/821 |
| 4,730,340 | 3/1988 | Frazier, Jr. | 375/1 |
| 4,872,200 | 10/1989 | Jansen | 380/34 |
| 4,901,307 | 2/1990 | Gilhousen et al. | 370/18 |
| 4,933,952 | 6/1990 | Albrieux et al. | 375/1 |
| 4,939,745 | 7/1990 | Kirimoto et al. | 375/1 |
| 5,056,109 | 10/1991 | Gilhousen et al. | 375/205 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/205 |
| 5,177,765 | 1/1993 | Holland et al. | 375/1 |
| 5,257,283 | 10/1993 | Gilhousen et al. | 375/200 |
| 5,265,119 | 11/1993 | Gilhousen et al. | 375/205 |
| 5,267,261 | 11/1993 | Blakeney, II et al. | 375/1 |
| 5,267,262 | 11/1993 | Wheatley, III | 375/200 |
| 5,363,401 | 11/1994 | Lucas et al. | 375/1 |
| 5,420,850 | 5/1995 | Umeda et al. | 370/18 |
| 5,432,843 | 7/1995 | Bonta | 379/60 |
| 5,490,165 | 2/1996 | Blakeney, II et al. | 375/205 |
| 5,509,035 | 4/1996 | Teidemann, Jr. et al. | 375/356 |
| 5,511,067 | 4/1996 | Miller | 370/332 |
| 5,577,022 | 11/1996 | Padovani et al. | 370/13 |
| 5,600,706 | 2/1997 | Dunn et al. | 379/59 |

FOREIGN PATENT DOCUMENTS 9200639  1/1992  WIPO ............................ H04L 27/30

Primary Examiner—Stephen Chin
Assistant Examiner—Joseph Roundtree
Attorney, Agent, or Firm—Russell B. Miller; Roger W. Martin

[57] ABSTRACT

The system and method determines whether the expected location of the pilot channel in the PN code sequence (i.e. the PN code phase offset) has been detected in an initial search window centered on the expected pilot PN code phase offset. If not, a new search window is defined which is advanced in the PN code sequence from the initial search window. If the actual location of the pilot channel in the PN code sequence is not detected in the new search window, a subsequent search window is defined which is retarded in the PN sequence from all previous search windows. This iterative "spiral" searching method is repeated with increasingly divergent alternating advanced and retarded search windows until either the actual location of the pilot channel in the PN code sequence is detected, or a predetermined maximum number of iterations has occurred.

12 Claims, 3 Drawing Sheets

SYSTEM AND METHOD FOR RAPIDLY REACQUIRING A PILOT CHANNEL

BACKGROUND OF THE INVENTION

I. Field of the Invention

The present invention relates to wireless communication systems.

More particularly, the present invention relates to a novel and improved system and method for rapidly reacquiring a pilot channel in a wireless communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition. The use of a pilot signal enables the mobile station to acquire local base station communication system in a timely manner. The mobile station gets synchronization information, including the psuedorandom noise (PN) code phase offset, and relative signal power information from the received pilot signal.

Once a pilot channel has been acquired, the mobile telephone acquires a synchronization channel that is associated with the pilot channel, to receive fine tuning of its timing instructions and thereby permit the mobile telephone to temporally synchronize its internal circuitry with the mobile telephone system time. It can be appreciated in light of the above discussion that it is important that the internal time of the mobile telephone be synchronized with the mobile telephone system time, particularly in CDMA systems. This is to enable the mobile telephone to know where in the PN code sequence the base station is, to enable communication between the base station and the mobile telephone. Accordingly, when the mobile telephone is in contact with a system base station, the base station transmits system time to the mobile telephone to facilitate synchronization.

After synchronization, the mobile telephone monitors yet a third channel, commonly referred to as the "paging channel", to monitor for incoming calls. To increase system capacity, some mobile telephone systems use so-called "slotted paging", which relies on what might be thought of as temporal multiplexing of the paging channel. In other words, a mobile telephone in a slotted paging environment is assigned periodic windows (referred to as "slots") during which the mobile telephone may be paged, with the periods between the windows being reserved for paging other mobile telephones via the same paging channel.

To advantageously conserve battery power, the mobile telephone ordinarily is partially "powered down" between slots. By partially "powered down" is meant that most, but not all, of the electrical components of the mobile telephone are de-energized. When partially powered down, the mobile telephone is referred to as being "asleep". While asleep, the mobile telephone does not demodulate the pilot, synchronization, or paging channel broadcast by the base station. However, to maintain synchronization, a clock that is internal to the mobile telephone keeps time.

When it is time to monitor an assigned slot, an internal clock of the mobile telephone indicates that the assigned "sleep" period has terminated, and accordingly the mobile telephone "powers up", i.e., awakens, to monitor its paging channel. Once awakened, the mobile telephone also seeks to reacquire and monitor the pilot channel which is associated with the assigned paging channel.

It happens that small timekeeping errors by the internal clock of the mobile telephone can cause the internal time of the mobile telephone to be slightly different than the system time when the mobile telephone awakens. As an undesirable consequence, when the mobile telephone reawakens, reacquisition of the pilot channel can be delayed. This is because the internal time of the mobile telephone indicates a pilot channel location in the PN code sequence that is different from the actual location. This problem is further compounded by any relative motion of the mobile telephone with respect to the base station while the mobile telephone is asleep.

Accordingly, upon reawakening after sleep, existing mobile telephones search for the pilot channel signal in a predetermined window centered about the location in the PN code sequence at which the mobile telephone expects the pilot channel to be, in accordance with standards set forth in the Telecommunications Industry Association (TIA) publication entitled "Mobile Station-Base Station Compatibility Standard for Dual-Mode Wideband Spread Spectrum Cellular System TIA/EIA/IS95". As the skilled artisan will readily appreciate, this reacquisition search window should be sufficiently small to avoid prolonged searching, and sufficiently large to account for typical internal clock errors. Unfortunately, the search window under existing standards is not dynamically established to account for variable conditions, but as stated above is predetermined. As recognized herein, this relative inflexibility of search window size can result in inefficient and unsuccessful searches, thereby requiring the mobile telephone to completely reinitialize. Complete re-initialization is a relatively lengthy and thus undesirable procedure, simple reacquisition.

In an ideal system where the hardware set up time is zero, a search window of one hypothesis would be ideal. However, because it takes time to set up the hardware to conduct searches windows of hypotheses are tested. The longer the time required to set up the hardware, the larger the necessary window size. In complex systems, a searcher is required to search a window of many hypotheses and upon finding a candidate synchronized sequence, will repeat the search over the window a predetermined number of times to verify the synchronization. This process requires an unacceptably long acquisition time.

Accordingly, it is an object of the present invention to provide a system for efficiently searching, after a mobile telephone sleep period, for a pilot channel with which the mobile telephone has previously been synchronized. Another object of the present invention is to provide an efficient pilot channel reacquisition system in a mobile telephone. Still another object of the present invention is to provide a pilot channel reacquisition system in a mobile telephone that is easy to use and cost-effective to manufacture and implement.

SUMMARY OF THE INVENTION

The present invention is a novel and improved system and method for reacquiring a pilot channel signal of a mobile telephone system. In accordance with the present invention, the system is a code division multiple access (CDMA) system, and the pilot channel consequently is characterized by a predetermined PN code sequence.

As disclosed in detail below, the method determines, upon a reacquisition attempt of the pilot channel, whether the expected location of the pilot channel in the PN code sequence (i.e. the PN code phase offset) has indeed been detected in an initial search window centered on the expected pilot PN code phase offset (i.e. the expected location of the pilot channel in the pilot PN code sequence). If the actual location of the pilot channel in the PN code sequence is not detected in the initial search window, a new search window is defined which is advanced in the PN code sequence from the initial search window. If the actual location of the pilot channel in the PN code sequence is not detected in the new search window, a subsequent search window is defined which is retarded in the PN sequence from all previous search windows. This iterative "spiral" searching method is repeated with increasingly divergent alternating advanced and retarded search windows until either the actual location of the pilot channel in the PN code sequence is detected, or a predetermined maximum number of iterations has occurred.

In another aspect, a system is disclosed for reacquiring a pilot channel that has been previously acquired by a mobile telephone in a code division multiple access (CDMA) system according to the method described above. The apparatus includes logic means for determining an initial search window. Additionally, the apparatus includes logic means for determining whether the actual location of the pilot channel in the PN code sequence has indeed been detected in an initial search window centered on the expected pilot channel PN code phase offset. The system includes logic means for determining if the actual location of the pilot channel in the PN code sequence is not detected in the initial search window, and defining a new search window which is advanced in the PN sequence from the initial search window. The system further includes logic means for determining if the actual location of the pilot channel in the PN code sequence is not detected in the new search window, and defining a subsequent search window which is retarded in the PN sequence from all previous search windows. The system further includes logic means to repeat this iterative searching method with increasingly divergent alternating advanced and retarded search windows until either the actual location of the pilot channel in the PN code sequence is detected, or a predetermined maximum number of iterations has occurred. The system is also disclosed in combination with a mobile telephone, and with a mobile telephone system.

In a further aspect of the present invention, a computer logic device includes a computer logic storage device readable by a digital processing system and instructions embodied in the logic storage device. The instructions are executable by the digital processing system for performing method steps for reacquiring a mobile telephone system pilot channel characterized by code division multiple access (CDMA) modulation. These method steps include the above-disclosed method steps.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
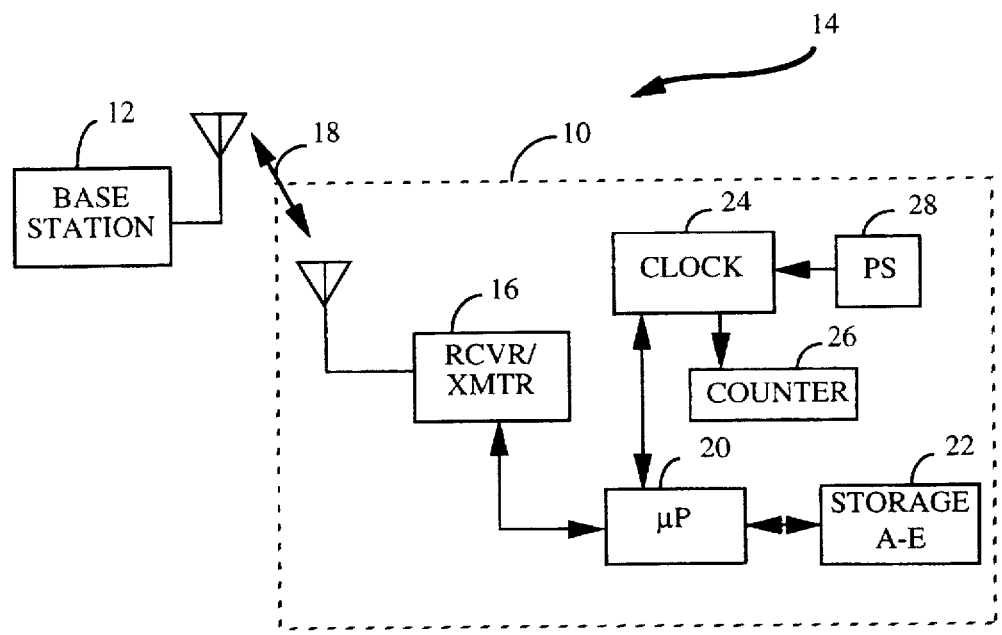
FIG. 1 is a schematic view of a mobile telephone system of the present invention.

Referring initially to FIG. 1, a mobile telephone 10 is shown in wireless communication with a base station 12 of a mobile telephone system, generally designated 14. It is to be understood that although a single base station 12 and single mobile telephone 10 are shown in FIG. 1 for clarity of disclosure, the telephone system 14 would typically include other mobile telephones and base stations (not shown). In the presently preferred embodiment, the telephone system 14 implements code division multiple access (CDMA) principles to discriminate one mobile telephone signal from another. Details a preferred CDMA system are set forth in the above referenced U.S. Pat. No. 4,901,307.

As shown in FIG. 1, the mobile telephone 10 includes a receiver/transmitter 16 that can communicate with the base station 12 via a wireless link 18. Further, the mobile telephone 10 includes control circuitry for controlling the reception and transmission of data by the receiver/transmitter 16. In FIG. 1, this control circuitry is rendered, for simplicity, as a digital microprocessor 20. As also shown, the microprocessor 20 can access a data storage device 22. As more fully disclosed below, the data storage device 22 contains instructions that are executable by the microprocessor 20 for undertaking the present invention. Accordingly, with the exception of the logical structure of the data storage device 22, the mobile telephone 10 preferably is a CDMA mobile telephone as is known in the art.

Additionally, the mobile telephone 10 includes an internal clock 24.

In the presently preferred embodiment, the internal clock 24 is a voltage controlled temperature controlled crystal oscillator (VCTCXO). However, it should be noted that other clock devices, whether or not crystal-based, are equally suitable for use with the present invention. Accordingly, the output signal of the clock 24 is a sequence of clocking pulses that are sent to a counter 26, with the rate of clocking pulse output being controlled by controlling the voltage of an input signal to the clock 24 from a clock power supply 28 in accordance with well-known principles.

In a spread spectrum communication system, a pilot signal is used to synchronize a mobile station-in phase and frequency to the transmissions of a base station. In the exemplary embodiment, the spread spectrum communication system is a direct-sequence spread spectrum communication system. Examples of such systems are discussed in U.S. Pat. No. 5,056,109 and U.S. Pat. No. 5,103,459. In a direct-sequence spread spectrum communication system, the transmitted signals are spread over a frequency band greater than the minimum bandwidth necessary to transmit the information by modulating a carrier wave by the data signal, then modulating the resulting signal again with a wideband spreading signal. In a pilot signal, the data can be looked at as an all ones sequence.

The spreading signal is typically generated by a linear feedback shift register, the implementation of which is described in detail in the aforementioned patents. The spreading signal can be viewed as a rotating phasor of the form:

$$s(t) = Ae^{(\omega t + \phi)} \tag{1}$$

In order to acquire, the mobile station must synchronize to the received signals from the base station in both phase, $\phi$, and in frequency, $\omega$. The object of the searcher operation is to find the phase of the received signal, $\phi$. After finding the phase of the spreading signal, $\phi$, the frequency is found in using a demodulation element that has hardware for both phase and frequency tracking. The method by which a mobile finds the phase of the received signal is by testing a set of phase hypotheses, referred to as a window and determining if one of the hypothetical phase hypotheses, also referred to as offset hypotheses, is correct. An example of a searcher receiver operating with "window" style searches is given in copending U.S. patent application Ser. No. 08/509,721, entitled "METHOD AND APPARATUS FOR PERFORMING SEARCH ACQUISITION IN A CDMA COMMUNICATION SYSTEM", assigned to the assignee of the present invention and incorporated herein by reference.

Figure 4:
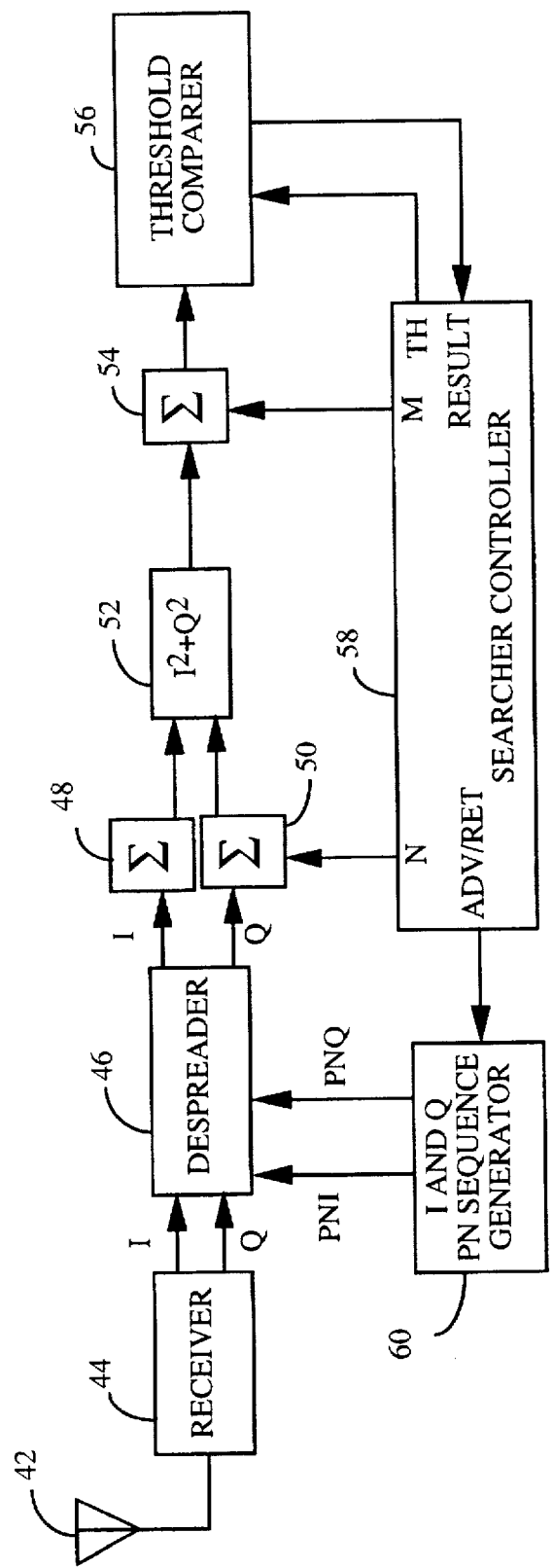
FIG. 4 is a block diagram of the relevant portions of a CDMA receiver for use with the present invention.

Referring now to FIG. 4, a description of the relevant portion of the receiver/transmitter 16 will be given. Upon power up, a spread spectrum signal is received at antenna 42.

The objective of the apparatus shown in FIG. 4 is to gain synchronization between PN sequences generated by PN sequence generator 60 and the received spread spectrum signal which is spread by identical PN sequences of unknown phase.

In the exemplary embodiment, both the means at the base station (not shown) that spreads the pilot signal and PN generator 60 are a maximal length shift register which generate the PN code sequences for spreading and despreading the pilot signal respectively. Thus, the operation of obtaining synchronization between the codes used to despread the received pilot signal and the PN spreading code of the received pilot signal involves determining the time offset of the shift register.

The spread spectrum signal is provided by antenna 42 to receiver 44. Receiver 44 downconverts the signal and provides the signal to despreading element 46. Despreading element 46 multiplies the received signal by the PN code generated by PN generator 60. Due to the random noise-like nature of the PN codes the product of the PN code and the received signal should be essentially zero except at the point of synchronization.

Searcher controller 58 provides an offset hypothesis to PN generator 60. In the exemplary embodiment, the received signal is modulated by quadrature phase shift keying (QPSK), so PN generator provides a PN sequence for the I modulation component and a separate sequence for the Q modulation component to despreading element 46. Despreading element 46 multiplies the PN sequence by its corresponding modulation component and provides the two output component products to coherent accumulators 48 and 50.

Coherent accumulators 48 and 50 sum the product over the length of the product sequence. This product sequence may be of an arbitrary length of PN chips referred to as a "search window" which is defined by a PN offset hypothesis (i.e. the start point of the search) and a search duration (i.e. a "width" of the search window). Coherent accumulators 48 and 50 are responsive to signals from searcher controller 58 for resetting, latching and setting the summation period. The sums of the products are provided from summers 48 and 50 to squaring means 52. Squaring means 52 squares each of the sums and adds the squares together.

The sum of the squares is provided by squaring means 52 to noncoherent combiner accumulator 54. Noncoherent acculumator 54 determines an energy value from the output of squaring means 52. Noncoherent accumulator 54 serves to counteract the effects of a frequency discrepancy between the base station transmit clocks and the mobile station receive clock and aids in the detection statistic in a fading environment. If one knows that the frequency of the two clocks is exactly the same and that there are no deep fades then the ideal approach is to integrate the sequence over the entire accumulation period in the form:

$$E = \left( \sum_{n=1}^{N} I(n) PNI(n) \right)^2 + \left( \sum_{n=1}^{N} Q(n) PNQ(n) \right)^2 \tag{2}$$

where PNI(n) and PNQ(n) can be ±1.

If, however, there is a probability of frequency mismatch or fading, then the correlator sacrifices some of its detection statistic in order to have a more robust correlation technique of the form:

$$E = \sum_{k=1}^{M} \left\{ \left( \sum_{n=1}^{N} I(n + (k-1)N) \cdot PNI(n + (k-1)N) \right)^2 + \left( \sum_{n=1}^{N} Q(n + (k-1)N) \cdot PNQ(n + (k-1)N) \right)^2 \right\} \quad (3)$$

Searcher controller 58 provides the value M to noncoherent accumulator 54.

Noncoherent accumulator 54 provides the energy signal to comparison means 56. Comparison means 56 compares the energy value to predetermined thresholds supplied by searcher controller means 58. The results of each of the comparisons is then fed back to searcher controller 58. Search controller 58 examines the comparisons and determines whether the window contains likely candidates for the correct offset.

Figure 2:
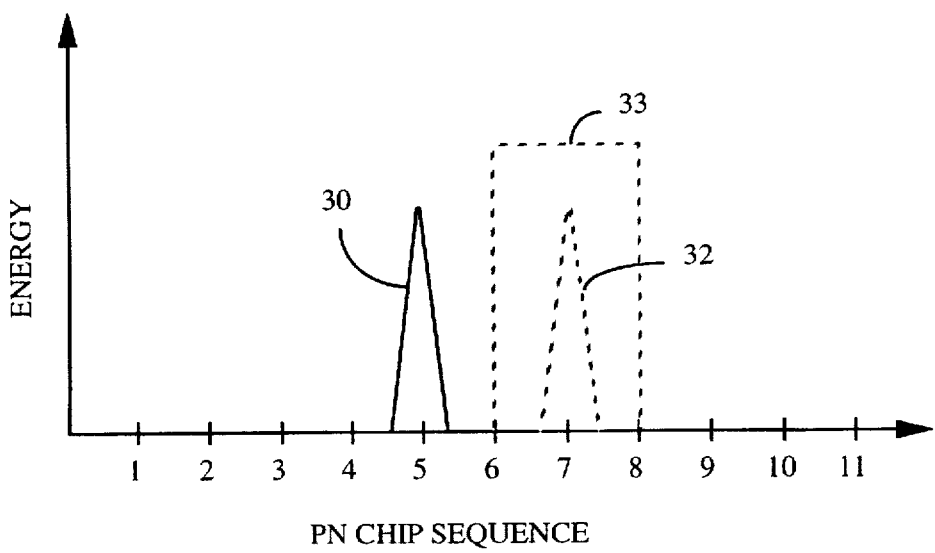
FIG. 2 is a graph showing actual and expected pilot channel correlation energy peaks as a function of PN code chip offset.

FIG. 2 illustrates a graph showing actual and expected pilot channel correlation energy peaks as a function of PN code chip offset. For simplicity, the chips in the code sequence that are graphed along abscissa in FIG. 2 are represented by consecutive integers. As shown in FIG. 2, at any given instant in time, the PN code sequence of the pilot channel will be at a particular phase offset in the sequence. A search window 33, which is described in greater detail below, defines the area in PN-space in which the apparatus of FIG. 4 generates correlation energy measurements. Thus, in the example shown in FIG. 2, the correlation energy as measured by the apparatus of FIG. 4, when the code offset hypothesis of the searcher receiver matches the actual code offset of the pilot channel, is represented as peak 30.

FIG. 2 also shows that after a sleep period, the clock 24 (see FIG. 1) might have induced an internal timekeeping error, resulting in a code offset hypothesis that is incorrect (i.e. has "slewed"). In this case, the apparatus of FIG. 4 would expect to detect a correlation energy maximum at peak 32. Thus, it would center an initial search window 33 around the expected peak 32. As shown in FIG. 2, the expected PN code phase offset represented by peak 32 can be different from the actual PN code phase offset represented by peak 30. The present invention affords a method and system by which the mobile telephone 10 can efficiently locate the actual PN code phase offset without requiring complete re-initialization. It should be noted that the "width" or duration of search window 33 in PN-space is somewhat arbitrary and is a tradeoff between search speed and resolution of the search window.

Figure 3:
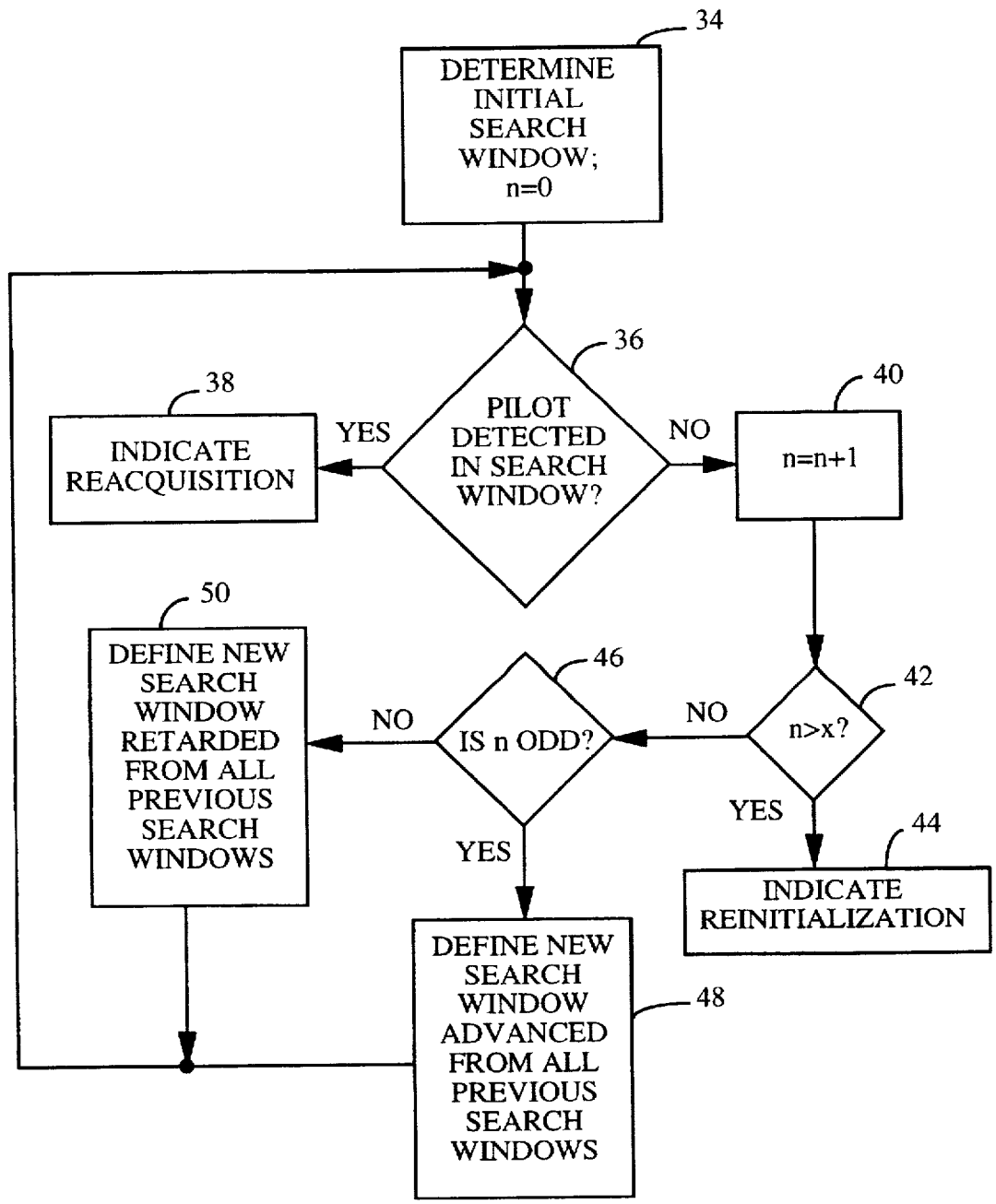
FIG. 3 is a flow chart showing the logic of the present invention, as implemented on a control chip of a mobile telephone.

FIG. 3 illustrates the structure of the logic of the present invention as embodied in computer-readable logic structures on the storage device 22 (FIG. 1). Those skilled in the art will appreciate that the Figures illustrate the structures of logic elements that function according to this invention. Manifestly, the invention is practiced in one essential embodiment by a digital processing apparatus (that is, a computer or microprocessor) that performs a sequence of instructions corresponding to the steps shown in the Figures.

These instructions may reside in, i.e., be embodied by, logic structures/circuits on a data storage device including a data storage medium, such as the storage device 22 shown in FIG. 1. The machine component is shown in FIG. 1 as a combination of logic elements A–E that are embodied in the storage device 22, which advantageously can be electronic read-only memory (ROM) or electronic random access memory (RAM), or other appropriate data storage device. Alternatively, the instructions can be embodied in the form of computer program code elements on semiconductor devices, on magnetic tape, on optical disks, on a DASD array, on magnetic tape, on a conventional hard disk drive, on electronic read-only memory or on electronic random access memory, or other appropriate data storage device.

Now referring to FIG. 3, the logic of the present invention can be understood. Starting at block 34, the microprocessor 20 (FIG. 1) initializes a dummy variable "n" to zero and determines, based on timing signals generated by the clock 24, an initial search window centered on an expected PN code offset of the pilot channel. At decision diamond 36, the microprocessor 20 determines whether the pilot channel is indeed in the expected location in the PN sequence, i.e., whether the pilot signal has been detected in the initial search window based on the measured correlation energy as determined by the apparatus of FIG. 4. If the pilot channel is in the expected location in the PN sequence, the microprocessor 20 moves to block 38 to indicate reacquisition of the pilot channel, and then the microprocessor 20 ends the search function shown in FIG. 3.

If, on the other hand, the microprocessor 20 determines, at decision diamond 36, that the pilot channel is not in the expected location in the coding sequence, the microprocessor 20 increments the dummy variable "n" in block 40 and moves to decision diamond 42, wherein it is determined whether the dummy variable "n" exceeds a predetermined value "x". If the test at decision diamond 42 is positive, the microprocessor 20 indicates that a complete re-initialization is necessary at block 44, and then the microprocessor 20 terminates the search function shown herein. Otherwise, the microprocessor 20 moves to block 46. As will become apparent after the disclosure below, at decision diamond 42 the microprocessor 20 essentially determines whether so many searches have failed that it would be nonproductive to continue to search around the initial expected pilot channel PN offset.

At block 46, the microprocessor 20 determines whether the dummy variable "n" is odd. If so, the flow proceeds to block 48 where a new search window is defined which is advanced along the PN sequence with respect to all previous search windows. Thus, in the first iteration with "n" equal to one, the new search window will be advanced along the PN sequence with respect to the initial search window which was originally defined in block 34. This new search window is preferably of the same duration as the initial search window, and is preferably immediately adjacent to, but does not overlap, the first search window. For example, if the previous search window were two PN chips in duration, and the initial PN offset hypothesis defined the window to extend from chip number six to chip number seven (inclusive) as shown by search window 33 of FIG. 2, the new search window defined in block 48 would also be two PN chips wide, and would extend from chip number eight to chip number nine (inclusive). The search window duration of two PN chips is merely exemplary and is not an affirmative limitation on the present invention. As previously stated, the search duration (i.e. how many chips are successively searched in the window) is somewhat arbitrary.

If, at block 46, the microprocessor 20 determines that the dummy variable "n" is even, then the flow proceeds to block 50. At block 50 a new search window is defined which is retarded along the PN sequence with respect to all previous search windows. Thus, in the second iteration with "n" equal to two (assuming, of course, that the first iteration failed to reacquired the pilot signal and continuing the previous example), the new search window defined in block 50 would also be two PN chips wide, and would extend from chip number four to chip number five (inclusive). Note that in the exemplary graph of FIG. 2, it so happens that this search window would encompass the actual PN code offset of the pilot signal.

Regardless of whether "n" is odd or even, once the new search window is defined in either block 48 or block 50, the flow returns to decision diamond 36 where the microprocessor 20 determines whether the pilot channel PN sequence has been successfully detected within the search window. The flow continues in this "spiraling" manner, first advancing and then retarding the search window, until either the pilot channel PN sequence is successfully detected within the search window in block 36, or the number of executed iterations has exceeded the desired number of iterations in block 42. Thus, in the exemplary graph of FIG. 2, the search would successfully reacquire the pilot signal at decision diamond 36 on the second iteration (i.e. n=2), and would indicate reacquisition in block 38.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for acquiring a pilot signal having a pseudo-noise (PN) code sequence in a code-division multiple access (CDMA) communication system comprising the steps of:
   (a) defining an initial search window centered about an expected location of said pilot signal in said PN code sequence;
   (b) despreading said pilot signal in said initial search window;
   (c) defining an advanced search window, advanced in said PN code sequence with respect to said initial search window, if an actual location of said pilot signal in said PN code sequence is not detected within said initial search window;
   (d) despreading said pilot signal in said advanced search window if said actual location of said pilot signal in said PN code sequence is not detected within said initial search window;
   (e) defining a retarded search window, retarded in said PN code sequence with respect to said initial search window and said advanced search window, if an actual location of said pilot signal in said PN code sequence is not detected within said advanced search window; and
   (f) despreading said pilot signal in said retarded search window if said actual location of said pilot signal in said PN code sequence is not detected within said advanced search window.

2. The method of claim 2 further comprising the steps of:
   (g) determining a maximum number of iterations; and
   (h) repeating steps (a)-(f) until either said actual location of said pilot signal in said PN code sequence is detected or steps (a)-(e) have been repeated for said maximum number of iterations.

3. The method of claim 2 wherein said CDMA communication system includes a remote station and a base station which broadcasts said pilot signal and a slotted paging channel having a cycle of slots, said remote station having an assigned slot of said cycle of slots, said remote station having a sleep mode, an awake mode, and an internal clock, the method further comprising the steps of:
   initially acquiring, in said remote station, said pilot signal and said slotted paging channel;
   entering, in said remote station, said sleep mode during a non-assigned slot of said cycle of slots;
   counting, in said internal clock, a predetermined number of clock cycles;
   entering, in said remote station, said awake mode during said assigned slot; and
   performing steps (a)-(h) during said assigned slot.

4. An system for acquiring a pilot signal having a pseudo-noise (PN) code sequence in a code-division multiple access (CDMA) communication system comprising the steps of:
   means for defining an initial search window centered about an expected location of said pilot signal in said PN code sequence;
   means for despreading said pilot signal in said initial search window;
   means for defining an advanced search window, advanced in said PN code sequence with respect to said initial search window, if an actual location of said pilot signal in said PN code sequence is not detected within said initial search window;
   means for despreading said pilot signal in said advanced search window if said actual location of said pilot signal in said PN code sequence is not detected within said initial search window;
   means for defining a retarded search window, retarded in said PN code sequence with respect to said initial search window and said advanced search window, if an actual location of said pilot signal in said PN code sequence is not detected within said advanced search window; and
   means for despreading said pilot signal in said retarded search window if said actual location of said pilot signal in said PN code sequence is not detected within said advanced search window.

5. The method of claim 2 wherein each of said advanced search windows are advanced in said PN code sequence relative to all previous of said advanced search windows, and wherein each of said retarded search windows are retarded in said PN code sequence relative to all previous of said retarded search windows.

6. The method of claim 5 wherein each of said advanced search windows are adjacent but not overlapping in said PN code sequence, and wherein each of said retarded search windows are adjacent but not overlapping in said PN code sequence.

7. A method for reacquiring a pilot signal having a pseudo-noise (PN) code sequence in a code-division multiple access (CDMA) communication system comprising the steps of:
   determining whether the PN code phase of the pilot signal is within a PN code phase search window; and
   if said PN code phase of said pilot signal is not within said PN code phase search window, alternatingly advancing and retarding said PN code phase search window in PN code phase until said PN code phase of said pilot signal is detected within said PN code phase search window.

8. The method of claim 7 further comprising the step of, if said PN code phase of said pilot signal is not within said PN code phase search window, alternatingly advancing and retarding said PN code phase search window in PN code phase until a predetermined number of advanced and retarded PN code phase search windows have been searched.

9. An apparatus for reacquiring a pilot signal in a communication device, said pilot signal having a pilot pseudo-noise (PN) code phase, said apparatus comprising:

a receiver for receiving and downconverting said pilot signal;

a PN code sequence generator for generating a despreading PN code sequence having a despreading PN code phase;

a despreader, coupled to said receiver and said PN code sequence generator, for multiplying said downconverted pilot signal by said despreading PN code sequence to produce a product sequence;

an accumulator, coupled to said despreader, for determining an energy of said product sequence;

a comparator, coupled to said accumulator, for comparing said energy of said product sequence with a predetermined threshold; and a searcher controller, coupled to said PN sequence generator, said accumulator, and said comparator, for alternatingly advancing and retarding said despreading PN code phase until said despreading PN code phase matches said pilot PN code phase.

10. The apparatus of claim 9 wherein said searcher controller alternatingly advances and retards said despreading PN code phase for a predetermined number of iterations.

11. The apparatus of claim 10 wherein said downconverted pilot signal comprises in-phase and quadrature-phase pilot signal components, and wherein said PN code sequence generator generates in-phase and quadrature-phase despreading PN code sequence components of said despreading PN code sequence, and wherein said despreader multiplies said in-phase pilot signal component by said in-phase despreading PN code sequence component to produce an in-phase component of said product sequence and multiplies said quadrature pilot signal component by said quadrature-phase despreading PN code sequence component to produce a quadrature-phase component of said product sequence.

12. The apparatus of claim 11 wherein said accumulator further comprises:

an in-phase coherent accumulator for summing said in-phase component of said product sequence over a length of said in-phase component of said product sequence to produce an in-phase sum signal;

a quadrature-phase coherent accumulator for summing said quadrature-phase component of said product sequence over a length of said quadrature-phase component of said product sequence to produce a quadrature-phase sum signal;

squaring means for squaring and adding said in-phase sum signal and said quadrature-phase sum signal to produce a sum of squares signal; and a non-coherent accumulator for determining said energy of said product sequence in response to said sum of squares signal.

* * * * *